United States Patent
Utz et al.

(10) Patent No.: US 6,503,634 B1
(45) Date of Patent: *Jan. 7, 2003

(54) BARRIER FILMS

(75) Inventors: Helmar Utz, Koppigen (CH); Sabine Amberg-Schwab, Erlabrunn (DE); Gerhard Schottner, Heilsbronn (DE)

(73) Assignee: Fraunhofer-Gesellschaft zur Foerderung der angewandten Forschung e.V., Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/810,617

(22) Filed: Feb. 28, 1997

(30) Foreign Application Priority Data

Feb. 28, 1996 (DE) .......................... 196 07 524
Dec. 4, 1996 (DE) .......................... 196 50 286

(51) Int. Cl.$^7$ .................................. B32B 9/04
(52) U.S. Cl. .................... 428/448; 428/689; 427/419.2; 427/487
(58) Field of Search .................. 428/323, 327, 428/328, 329, 330, 331, 351, 448, 429, 332, 334, 336, 337, 411.1, 500, 474.4, 477.7, 532, 537.5, 688, 689, 446, 447, 452; 427/419.2, 487

(56) References Cited

U.S. PATENT DOCUMENTS

| | | | | |
|---|---|---|---|---|
| 3,456,044 A | * | 7/1969 | Pahlke | 264/25 |
| 5,316,855 A | * | 5/1994 | Wang et al. | 428/447 |
| 5,370,937 A | * | 12/1994 | Lee et al. | 428/448 |
| 5,372,880 A | * | 12/1994 | Lee et al. | 428/336 |
| 5,434,008 A | | 7/1995 | Felts | |
| 5,494,547 A | * | 2/1996 | Lee et al. | 156/182 |
| 5,576,101 A | * | 11/1996 | Saitoh et al. | 428/332 |
| 5,580,614 A | * | 12/1996 | Amberg-Schwab et al. | 427/493 |
| 5,589,252 A | * | 12/1996 | Matsuo et al. | 428/216 |
| 5,625,022 A | * | 4/1997 | Onishi | 528/15 |
| 5,645,923 A | * | 7/1997 | Matsuo et al. | 428/216 |
| 5,684,110 A | * | 11/1997 | Kawamura et al. | 528/15 |
| 5,691,400 A | * | 11/1997 | Carey et al. | 523/404 |
| 5,716,679 A | * | 2/1998 | Krug et al. | 427/515 |
| 5,744,243 A | * | 4/1998 | Li et al. | 428/447 |
| 5,766,680 A | * | 6/1998 | Schmidt et al. | 427/226 |
| 5,770,301 A | * | 6/1998 | Murai et al. | 428/213 |
| 5,804,631 A | * | 9/1998 | Mine et al. | 524/440 |
| 6,011,123 A | * | 1/2000 | Kurosawa et al. | 525/431 |

FOREIGN PATENT DOCUMENTS

| | | | |
|---|---|---|---|
| DE | 4303570 | | 8/1994 |
| DE | 4328767 | | 8/1995 |
| EP | 794053 | * | 9/1997 |
| WO | 87/01988 | | 4/1987 |

OTHER PUBLICATIONS

Encyclopedia of Polymer Science and Engineering, vol. 1, 1985.*
Neue Verpackung 11/91; SiOx–Folien; "Europapremiere für deutschen Hersteller"; pp. 20–22.

* cited by examiner

*Primary Examiner*—D. Lawrence Tarazano
(74) *Attorney, Agent, or Firm*—Marshall & Melhorn, LLC

(57) ABSTRACT

The invention concerns composites with excellent barrier properties to gases and water vapor. Such composites can be used, e.g., in foodstuff packaging or as technical membranes. The outstanding barrier effect is achieved by arranging on a substrate material, which, for example, may consist of biodegradable polymers, at least two films. At least one of these films consists of an organic-inorganic hybrid polymer (ORMOCER), at least one further film of a further barrier material or of a substrate material.

24 Claims, 2 Drawing Sheets

BARRIER FILMS

BACKGROUND OF THE INVENTION

1. Field of the Invention

This invention relates to composites of substrate material and more particularly to composites of substrate material coated with a barrier film. The coated composite substrate material is substantially impermeable to gases and water vapor. The invention also concerns a method for producing these composites. Such composites can be used in packaging, for example, in the form of foils, panels, shapes and hollow parts. Such composites can also be used for technical applications, for example, as membranes or protective films for sensors.

2. Summary of Related Art

Presently, metals, e.g., aluminum or tinplate, glass, polymers, e.g., EVOH or PVDC, and polymers provided with vaporized thin metallic or oxidic films or combinations thereof are generally employed as barrier materials. In comparing glass and metals to polymers, polymers are characterized by their low weight and the small amounts of material needed, for which reason they are frequently used especially in the packaging field. On the other hand, due to their structure and associated permeability to gases and water vapor, polymers are unsuited for applications involving especially high requirements as to barrier properties. Gaining increasingly in significance, especially due to ecological concerns, are the renewable or recycleable polymers. However, they display a comparatively high permeability to gas and present extremely insufficient barrier properties to water vapor. Therefore, they are barred from many applications.

Because of mostly insufficient barrier effect to gases and water vapor, polymers are often used in combination with other materials. For example, the barrier properties of polymers are improved by application of thin films of aluminum, aluminum oxide or silicon oxide, but the permeation rates continue to be excessively high for many applications and can be detected using conventional measuring techniques (oxygen permeability >0.5 $dm^3/(m^2\ d\ bar)$). Moreover, coated renewable polymers have exhibited, by far, higher permeation rates than coated standard polymers such as polyethylene or polypropylene.

Vaporized films are very sensitive to mechanical stresses. Therefore, it is mostly necessary to laminate the coated substrates, for example with a foil.

For some time it has been known (e.g., DE-OS 38 28 098 Al) to produce scratchproof coating materials by hydrolytic polycondensation of an organofunctional silane, for example with an aluminum compound, and, as the case may be, with inorganic oxide components. Hybrid polymers (so called ORMOCERS) synthesized in this fashion possess both inorganic and organic network structures. The inorganic siliceous network structure is obtained by the sol-gel process (e.g., C. J. Brinker, D. W. Scherer, Sol-Gel-Science; The Physics and Chemistry of Sol-Gel Processing, Academic Press, Inc., New York, 1989) via controlled hydrolysis and condensation of alkoxy silanes. The siliceous network allows specific modification by including additionally metal alkoxides in the sol-gel process. Additionally, an organic network is produced by polymerization of organofunctional groups that are introduced in the material by the organoalkoxy silanes. Reactive methacrylate, epoxy or vinyl groups are polymerized by thermal or photochemical induction. The ORMOCERs produced in this way can be applied on the medium to be coated by means of conventional application techniques (spraying, brushing, etc.). Despite suitable wetting behavior and sound film adhesion, even a composite of an ORMOCER film and a polymer foil is unable to reduce the high permeability of many polymers, and notably renewable polymers, to a degree that would be required, e.g., in foodstuff packaging.

OBJECT AND SUMMARY OF THE INVENTION

Therefore, the objective underlying the present invention is to coat substrate materials such that they become extensively impermeable to gases and water vapor.

This objective is satisfied according to the invention by composites with the characterizing features set forth in claim 1 and, in process-related respects, in claim 21. Favorable embodiments and improvements of the inventive composites are disclosed in the subclaims.

A composite substrate material having at least two films. At least one of the two films is a barrier film that contains inorganic-organic hybrid polymers (ORMOCER film). At least one other film is a substrate material, another barrier material in comparison to the original substrate material, or a single-coated substrate material having a far lower permeability.

The inventive composites have a high barrier effect to gases and water vapor.

Surprisingly, even the permeation rates of native polymers are reduced to such an extent that these polymers are extensively impermeable to gases and water vapor. Thus new applications for native polymers are created.

When applying an ORMOCER film 1 $\mu$m to 15 $\mu$m thick on a substrate material coated with a barrier film containing a metal, a metal oxide, a semiconductor, or a mixture thereof improves the barrier effect of the composite. Also, the mechanical stability of a coated substrate material is dramatically improved. Thus, the ORMOCER film assumes at the same time the function of a mechanical protective film that may make further process steps, such as lacquering or laminating, superfluous. For this reason it will mostly prove suitable to apply the ORMOCER film as the concluding film on the substrate material that has already been coated otherwise.

Of course, it is also possible to apply an ORMOCER film directly on the substrate material. Thereafter, further barrier films (for example a silicon oxide film) and/or a further substrate material film may be applied. For example, the silicon oxide sides of two coated substrate materials or the silicon oxide side of a coated and an uncoated substrate material can be combined on a conventional laminating system with ORMOCER as a laminating adhesive.

Surprisingly, a composite of two substrate materials with a barrier film arranged between the two substrates possess outstanding barrier properties. An example of this is polymer foils with an ORMOCER barrier film arranged between the foils. The ORMOCER film may also in this case serve as a laminating adhesive.

The barrier properties of polymers are improved by a factor of 100 by the application of a 100 nm thick silicon oxide barrier film. Surprisingly, on average, the barrier properties of this composite increase once again by a factor of 100 after the additional application and curing of an ORMOCER film. This fact shows the exact significance attached to a double-film application.

Instead of the silicon oxide film, metal films may also be used, e.g., films of aluminum or other prior art coating metals. Semiconductor films such as silicon film may also be used instead of silicon oxide film. Metal oxide films may also be used instead of silicon oxide films. Suitable metal oxide films include aluminum oxides, magnesium oxides, cerium oxides, hafnium oxides, tantalum oxides, titanium oxides (such as titanium dioxide, titanium trioxide, or titanium monoxide), yttrium oxides, or zirconium oxides, such as zirconium monoxide. Barrier films containing mixtures of the above listed substances are also suitable substitutes for silicon oxide. The metal films, metal oxide films, semiconductor films, or mixtures thereof typically have a thickness of 5 nm to 1000 nm, preferably between 20 and 150 nm.

All of the polymers (e.g., polyamide, polyethylene, polyproylene or polyester) lend themselves as substrate materials for coatings according to the invention.

Especially applicable as substrate materials are biologically decomposable polymers and particularly native polymers (cellophane, proteinaceous or starchy polymers) which have an inherently low barrier effect. Also paper, cardboard, coated paper or coated cardboard are suitable substrate materials. Particularly pronounced improvements in view of gas and water vapor permeability are achievable with the inventive coating in the case of thin substrate mainly (for example foils) having a thicknesses in the range of about 5 $\mu$m to 2 mm. In addition to foils, however, also panels, shapes, hollow articles, membranes or protective films for sensors are suited as substrate materials.

Sealability of the composites can be guaranteed with the use of sealable substrate films or by the application of sealable films on the composites. An example would be a copolymer film coextruded on polypropylene. Sealability is of great significance especially in foodstuff packaging.

Also the use of oriented polymers, for example axially or biaxially oriented polypropylene, has proved to be favorable.

Plastics coated in accordance with the invention notably native polymers, may be used for a great many new applications which previously were unavailable to plastics (for example foodstuff preserves). Metal or glass could in many areas be substituted by plastics coated in accordance with the invention. This would result in a drastic weight savings. Furthermore, plastics coated in this fashion allow the manufacture of barrier materials which, unlike metals, are transparent. Possible also is the realization of a sealable, nearly virtually pure barrier composite (refer to exemplary embodiment 5).

The barrier properties of the ORMOCER allow specific adjustment by kind and share of the organic and inorganic network as well as via the network converters. Both the wetting behavior and film adhesion as well as the barrier properties can be optimized in this way. The thickness of the applied ORMOCER film ranges typically from 1 $\mu$m to 15 $\mu$m. The invention covers all of the ORMOCERS from so far in the prior art. Explicit incorporation of the disclosure content of DE-OS 38 28 098 as well as DE 43 03 570 is hereby made. In DE 4303570, an ORMOCER is defined as an inorganic-organic hybrid polymer prepared by a hydrolytic condensation, optionally in the presence of a condensation catalyst and/or additives, of a first monomeric starting material having at least one crosslinkable, organofunctional silane of formula (II)

$$R'''_m SiX_{(4-m)} \tag{II}$$

in which the groups X, which can be the same or different, stand for hydrogen, halogen, alkoxy, acyloxy, alkycarbonyl, alkoxycarbonyl or —NR"2 (R"=H and/or alky) and the radicals R''', which can be the same or different, stand for alkyl, alkenyl, alkinyl, aryl, arylalkyl, alkylaryl, arylalkenyl, alkenylaryl, arylalkinyl or alkinylaryl, in which the radicals can be interrupted by O or S-atoms or the group-NR" and can carry one or more constituents from the group of halogens and optionally substituted amino, amide, aldehyde, keto, alkycarbonyl, carboxy, mercapto, cyano, hydroxy, alkoxy, alkoxycarbonyl, sulphonic acid, phosphoric acid, acryloxy, methacryloxy, epoxy or vinyl groups and m has the value 1, 2, or 3, in which the radical R''' and/or the constituent must be a crosslinkable radical or a constituent. An oligomer derived from the first monomeric starting material may be used in place of the first monomeric starting material or in combination with the first monomeric starting material.

The hydrolytic condensation of the polymer also includes a second monomeric starting material which has at least one metal compound of general formula III $$MeR_y \tag{III}$$

in which Me is a metal selected from Al, Zr, or Ti, the radicals R, which can be the same or different, stand for halogen, alkyl, alkoxy, acyloxy or hydroxy, in which said groups can be wholly or partly replaced by chelating ligands and/or an oligomer derived therefrom and/or an optionally complexed metal salt of an inorganic or organic acid. The value of y is 3 when Me is Al and y is 4 when Me is Zr or Ti. The preferred volume of first and second monomeric starting materials is 10–95 mole % of $R_m SiX_{(4-m)}$ and 5–75 mole % of $MeR_y$.

The further, inventive addition of functionalized $SiO_2$ particles, which in the ORMOCER synthesis are worked in and covalently bonded to the organic network, leads to a higher density of the inorganic network. Instead of $SiO_2$ particles, other particles may be used, for example functionalized $Al_2O_3$ particles. The barrier properties of the composite allow still further improvement.

Inventive composites with barrier properties can be produced by applying at least two films on a substrate material, with at least one of these films being a barrier film containing ORMOCERs. The barrier film containing ORMOCERs which film is applied by brushing, spraying, rolling, centrifugal or doctor processes and subsequently cured by heat and/or photochemical induction and/or thermal induction. At least one further film of another barrier material or substrate material is applied before or after application of the at least one ORMOCER film.

BRIEF DESCRIPTION OF THE DRAWINGS

Further details, characteristics and advantages of the present invention will become readily apparent from the following exemplary embodiments and in light of the accompanying the drawing figures, in which.

DETAILED DESCRIPTION OF THE PREFERRED EMBODIMENT

The following describes the exemplary composition of two suitable ORMOCER lacquers.

Coating Material 1

40 mol-% TMOS 12.5 mol-% Al (OBu$^s$)$_3$ 32.5 mol-% GLYMO 10 mol-% Zr (OPr)$_4$ 5 mol-% AMEO This lacquer system is cured thermally at 130° C.

Coating Material 2

70 mol-% MEMO 15 mol-% methacrylic acid 15 mol-% Zr (OPr)$_4$

This lacquer system is cured by photochemical or thermal induction.

Abbreviations:

TMO stetramethoxy silane

GLYMO 3-glycidoxypropyltrimethoxy silane

AMEO 3-aminopropyltriethoxy silane

MEMO 3-methacryloxypropyltrimethoxy silane

Al(OBu$^s$)$_3$ aluminum trisecondary butylate

Zr(OPr)$_4$ zirconium tetrapropylate

BOPP biaxially oriented polypropylene

PETP polyethylene terephthalate

Figure 1:
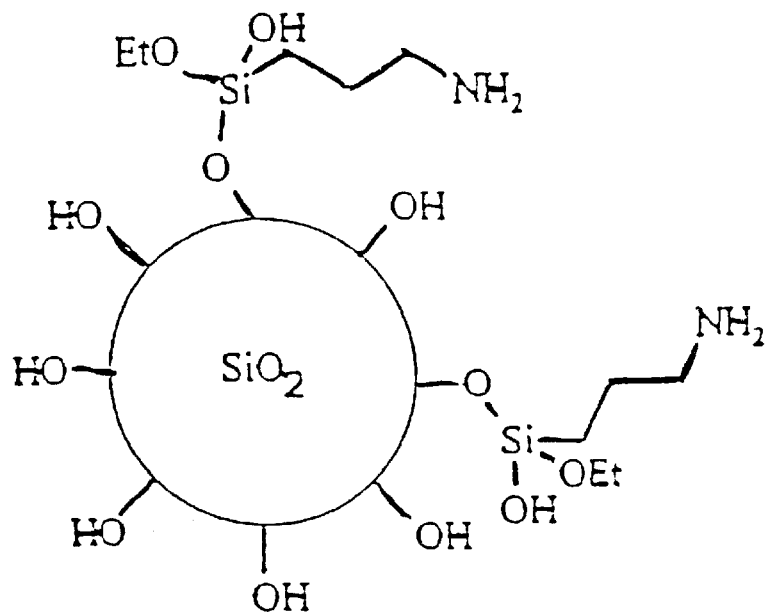
FIG. 1, a simplified illustration of an amino-functionalized $SiO_2$ particle.

To improve the barrier properties, approximately 1 mass-% of amino-functionalized (FIG. 1) or methacrylate-functionalized SiO$_2$ particles by the firm Degussa (Aerosil 200) may be incorporated additionally in both systems during the lacquer synthesis.

Several exemplary embodiments of inventive composites with barrier properties are described hereafter. The silicon oxide films are applied, e.g., by vaporization of silicon monoxide or by means of plasma CVD (chemical vapor deposition). ORMOCERs may be applied by conventional lacquering processes such as spraying, brushing, rolling or centrifuging; in the exemplary embodiments, coating may be carried out using a raster roll. The applied ORMOCER lacquers are cured preferably in-line, for example by heat or photochemical induction.

Exemplary Embodiment 1

Figure 2:
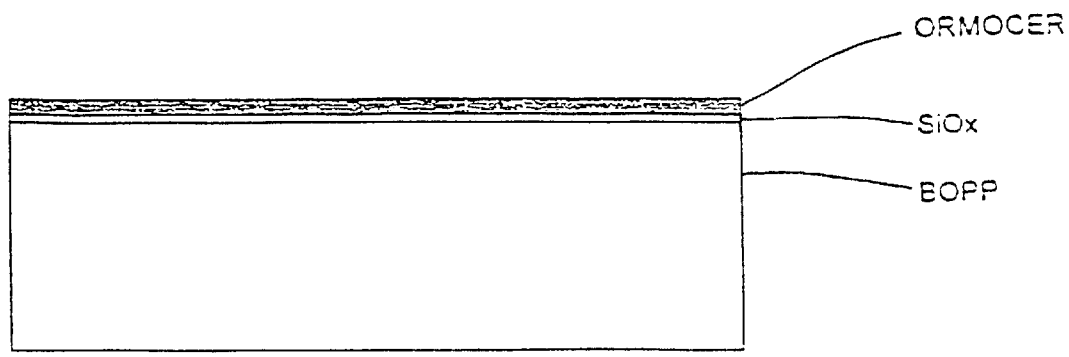
FIG. 2, an exemplary embodiment of a polymer foil with a vaporized $SiO_x$ film and an ORMOCER protective film.

An SiO$_x$ film about 100 nm thick is vaporized on a sealable BOPP foil of about 20 μm thickness. Next, the SiO$_x$ film is coated over with about 3 g/m$^2$ ORMOCER and cured (FIG. 2). The starting foil has at 23° C. and about 75% relative humidity an oxygen permeability of about 30 cm$^3$/(m$^2$ d bar). The oxygen permeability of the foil coated with ORMOCER is <1 cm$^3$/(m$^2$ d bar). The foil can be used as a sealable high-barrier packaging foil.

Exemplary Embodiment 2

An SiO$_x$ film about 100 nm thick is vaporized on a PETP foil about 12 μm thick. Next, the SiO$_x$ film is coated over with about 3 g/m$^2$ ORMOCER and cured. The starting foil has at 23° C. and about 75% relative humidity an oxygen permeability of about 2 cm$^3$/(m$^2$ d bar). The oxygen permeability of the foil coated with ORMOCER is no longer detectable with commercially available permeability measuring apparatuses, that is, it amounts to <0.05 cm3 (m$^2$ d bar). Upon application of a sealing lacquer or after laminating, e.g., to a polyethylene foil, the foil could be used as high-barrier packaging foil.

Exemplary Embodiment 3

To begin with, an SiO$_x$ film about 100 nm thick is vaporized on a cellophane foil about 20 μm thick. Next, the SiO$_x$ film is coated over with about 3 g/m$^2$ ORMOCER and cured (FIG. 2). The starting foil has at 23° C. and 0 to 85% relative humidity gradient a water vapor permeability of about 20 g/(m$^2$ d). The water vapor permeability of the foil coated additionally with ORMOCER amounts to approximately 0.5 g/(m$^2$ d). Hence, the water vapor permeability is so low that, unlike all other foils of renewable raw materials, the foil can be used also for packaging very moisture-sensitive goods.

Exemplary Embodiment 4

Figure 3:
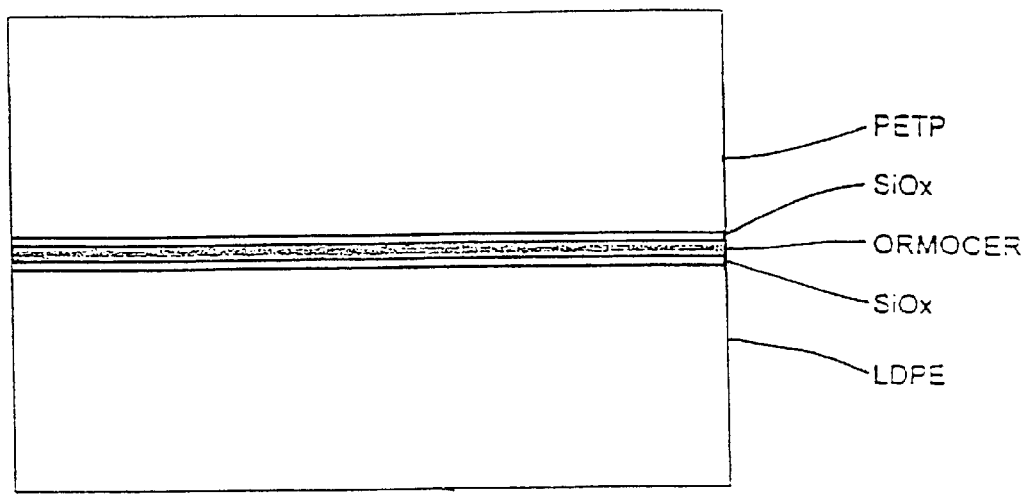
FIG. 3, an exemplary embodiment of a sealable composite consisting of two polymer foils with vaporized $SiO_x$ films and an ORMOCER film as a laminating adhesive.

The coated sides of two foils (a PEPT foil 12 μm thick and a LDPE foil 60 μm thick) coated with a vaporized SiO$_x$ are glued on a conventional laminating system (FIG. 3) with ORMOCER serving as a laminating adhesive. The resulting composite has an oxygen permeability of <0.05 cm3 (m$^2$ d bar), is sealable and can be used, e.g., for foodstuff packaging.

Figure 4:
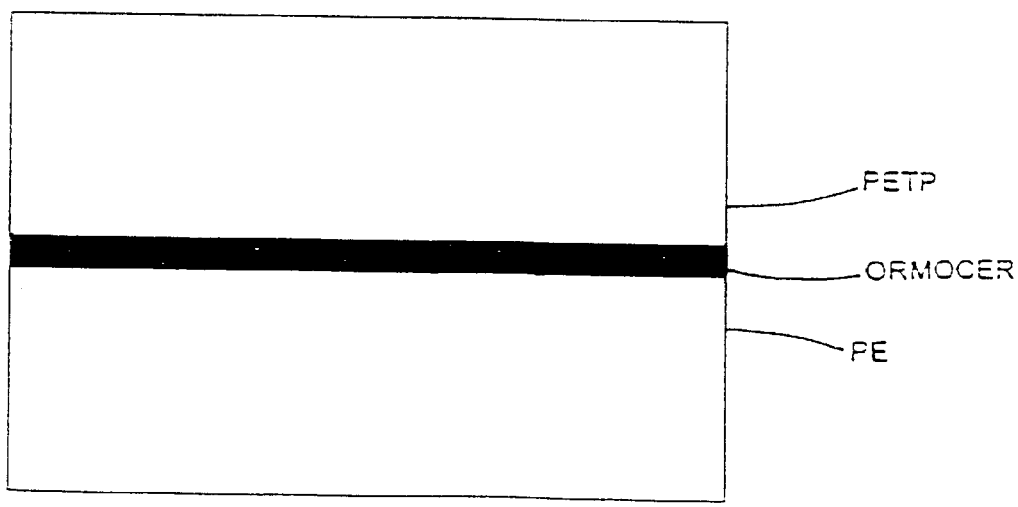
FIG. 4, an exemplary embodiment of a foil composite of two polymer foils between which an ORMOCER film is disposed as a laminating adhesive.

To realize a barrier composite with good barrier properties it is sufficient to glue (FIG. 4) uncoated polymer foil, for example of PP, PE or PET, using ORMOCERs as the laminating adhesive. To that end, for example a PE foil 15 μm thick is on a conventional laminating system glued to a PETP foil 15 μm thick by means of ORMOCER.

Exemplary Embodiment 5

The coated sides of two BOPP foils (one foil of PP-homopolymer and the other a sealable triple-film foil) coated with a vaporized SiO$_x$ film, each BOPP foil is 20 μm thick are glued on a conventional laminating system using ORMOCER as a laminating adhesive. The resulting composite is sealable and nearly virtually clean, that is, apart from the thin barrier films it contains only polypropylene as polymer.

Of course, inventive composites are not limited to foils. Also panels, shapes, hollow articles, membranes, protective films for sensors or other mediums, which should have a good barrier effect to gases and water vapor, lend themselves as substrate mediums for a coating according to the invention.

In addition to polymers, inventive barrier films may be applied also on cardboard, paper, coated cardboard or coated paper. For example, an ORMOCER primer may be applied first on cardboard or paper, followed by a metal or metal oxide film. Suitable as mechanical protective film on top of these would be again a concluding ORMOCER film. Paper laminated with an ORMOCER film on the vaporized side of a substrate foil may be used as well.

What is claimed is:

1. A method for the manufacture of composites with barrier properties, comprising:

applying at least two films to a substrate;

a first film of said at least two films comprising a barrier film containing ORMOCERS, said barrier film being applied by one of: brushing, spraying, rolling, centrifugal or doctor processes, and said film being subsequently cured by at least one of: heat, photochemical induction and thermal induction; and a second film of said at least two films comprising one of an additional barrier layer and an additional substrate, and said second film being applied before or after said first film.

2. A method according to claim 1, wherein:

said substrate is a first substrate;

said second film comprises a second barrier film containing ORMOCERS; and said composite comprises a second substrate material, said first and second barrier films are arranged between said first and second substrate materials.

3. A method according to claim 1, wherein:

said second film is a second substrate; and said first barrier film is a laminating film between said first and second substrate materials.

4. A method according to claim 3, wherein the first and second substrate materials are selected from the group consisting of paper, cardboard, coated paper, and coated cardboard.

5. A method according to claim 1, wherein said second film has a thickness between 5 nm and 1000 nm.

6. A method according to claim 1, wherein said first barrier film has a thickness between 1 $\mu$m and 15 $\mu$m.

7. A method according to claim 1, wherein said first barrier film comprises a plurality of functionalized particles, the plurality of functionalized particles being selected from the group consisting of $SiO_2$ and $Al_2O_3$.

8. A method according to claim 1, wherein the substrate material is selected from the group consisting of paper, cardboard, coated paper, and coated cardboard.

9. A method according to claim 1, wherein the substrate material consists of a polymer material.

10. A method according to claim 1, wherein the substrate material is selected from the group consisting of polyamide, polyethylene, polypropylene, and polyester.

11. A method according to claim 1, wherein the substrate material comprises at least one biologically degradable polymer.

12. A method according to claim 1, wherein the substrate material comprises at least one naturally occurring polymer.

13. A method according to claim 1, wherein the substrate material is selected from the group consisting of cellophane, a starchy material, and a proteinaceous material.

14. A method according to claim 1, wherein the substrate material is in the form of, and is selected from the group consisting of foils, panels, hollow articles, membranes and protective films for sensors.

15. A method according to claim 1, wherein the substrate material is a foil with a thickness between 5 $\mu$m and 2 mm.

16. A method according to claim 1, wherein the substrate material consists of an oriented polymer.

17. A method according to claim 1, wherein the substrate material is sealable and/or provided with a sealable film.

18. A composite forming a barrier against gases and liquids made according to the method of claim 1.

19. A composite formed according to the method of claim 1, wherein the composite has an oxygen permeability of less than 1 $cm^3/(m^2\ d\ bar)$ at 23° C. and about 75% relative humidity.

20. A composite formed according to the method of claim 1, wherein the composite has an oxygen permeability of less than 0.05 $cm^3/(m^2\ d\ bar)$ at 23° C. and about 75% relative humidity.

21. A composite formed according to the method of claim 1, wherein the composite has a water vapor permeability of less than 0.5 $g/(m^2\ d)$ at 23° C. and between 0 and 85% relative humidity.

22. A composite formed according to the method of claim 1, wherein the composite has an oxygen permeability of less than 1/30 of the oxygen permeability of the uncoated substrate at 23° C. and about 75% relative humidity.

23. A composite formed according to the method of claim 1, wherein the composite has an oxygen permeability of less than 1/40 of the oxygen permeability of the uncoated substrate at 23° C. and about 75% relative humidity.

24. A composite formed according to the method of claim 1, wherein the composite has a water vapor permeability of less than 1/40 of the water vapor permeability of the uncoated substrate at 23° C. and between 0 and 85% relative humidity.

* * * * *